Oct. 4, 1955    M. E. McCLELLAN ET AL    2,719,619
OVERRUNNING CLUTCH
Filed Aug. 25, 1954    2 Sheets-Sheet 1
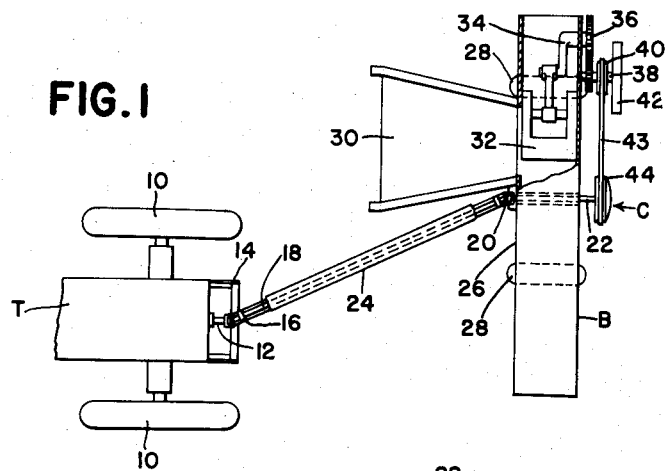
FIG. 1
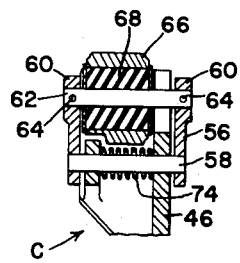
FIG. 3
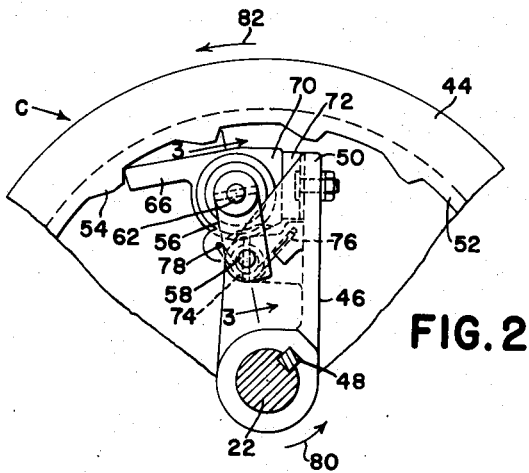
FIG. 2
FIG. 4
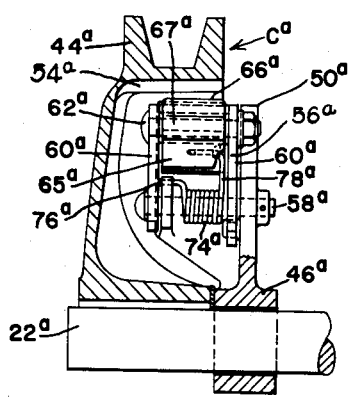
FIG. 5
INVENTOR.
M. E. McCLELLAN
A. B. SKROMME Oct. 4, 1955 M. E. McCLELLAN ET AL 2,719,619
OVERRUNNING CLUTCH
Filed Aug. 25, 1954 2 Sheets-Sheet 2

INVENTOR.
M. E. McCLELLAN
A. B. SKROMME

United States Patent Office 2,719,619
Patented Oct. 4, 1955

2,719,619
OVERRUNNING CLUTCH

Marcus E. McClellan and Arnold B. Skromme, Ottumwa, Iowa, assignors to Deere Manufacturing Co., Dubuque, Iowa, a corporation of Iowa Application August 25, 1954, Serial No. 452,118

12 Claims. (Cl. 192—46)

This invention relates to an overrunning clutch and more particularly to such clutch as having characteristics affording special utility in power-transmitting mechanisms in which the driving member is subject to fluctuations in angular speed relative to the driven member.

Such instances are common particularly in the agricultural field in which tractor-drawn implements are driven from the power take-off shaft of the tractor by propeller shafts that utilize several universal joints to accommodate offsets in the power train. In such cases, the velocity of the propeller shaft will not be uniform and consequently its speed will fluctuate relative to the speed of the member that it drives, particularly when the driven member is associated with a flywheel, for example. In the case of an agricultural baler, which may be taken as representative of one instance in which the invention affords a substantial improvement, the baler will have a bale chamber in which bales are formed by a reciprocating plunger. The crankshaft that drives the plunger carries a flywheel and the flywheel shaft is driven by a member that derives its power in the first instance from a propeller shaft that is connected to the tractor power take-off shaft. Because of the mass of the moving parts (plunger, crankshaft and flywheel), the driven members will overrun the propeller shaft when the power take-off shaft is disconnected from its power source. For this reason, it is conventional to provide an overrunning clutch in the driven member. Economy and other circumstances dictate the use of an overrunning clutch of the pawl and ratchet type, and it will be appreciated that during overrunning there will be fairly audible clicks as the lugs on the driven member overrun the pawl on the driving member. This is to be expected and cannot be avoided in those cases in which the power take-off shaft is disconnected from its power source, but the occurrence of the clicks during normal operation of the machine is annoying, which occurrence is due to minor angular gains of the driven member over the driving member as the velocity of the latter fluctuates. What happens is that upon the occurrence of each small angular gain, a lug behind the lug that is engaged by the driving pawl passes over the driving pawl, causing a click.

According to the present invention, this source of annoyance is eliminated by the provision of means operative to keep the pawl urged angularly toward its initially engaged lug so that upon the occurrence of minor angular gains of the driven member over the driving member the pawl will tend to follow its lug and remain engaged therewith. This result is accomplished by the provision of a driving arm on which the pawl is pivotally mounted for angular movement and biasing means operates between the driving arm and the pawl to urge the pawl in the direction of rotation. This means, of course, that the pawl will at times become separated from the driving arm but the possibility of the occurrence of noise and shock is obviated by the provision of cushioning means between the pawl and the driving arm. It is a general object of the invention to provide several forms of improved clutches of the general character indicated.

The foregoing and other important objects and desirable features inherent in and encompassed by the invention will become apparent as preferred embodiments of the invention are disclosed in detail in the following specification and accompanying sheets of drawings, the several figures of which will be described immediately below.

Fig. 1 is a schematic view showing a tractor-baler arrangement.

Fig. 2 is a fragmentary view, on an enlarged scale and partly in section, showing one form of the improved clutch.

Fig. 3 is a sectional view as seen along the line 3—3 of Fig. 2.

Fig. 4 is a view similar to Fig. 2 but showing a different form of clutch.

Fig. 5 is a section as seen along the line 5—5 of Fig. 4.

Figure 6:
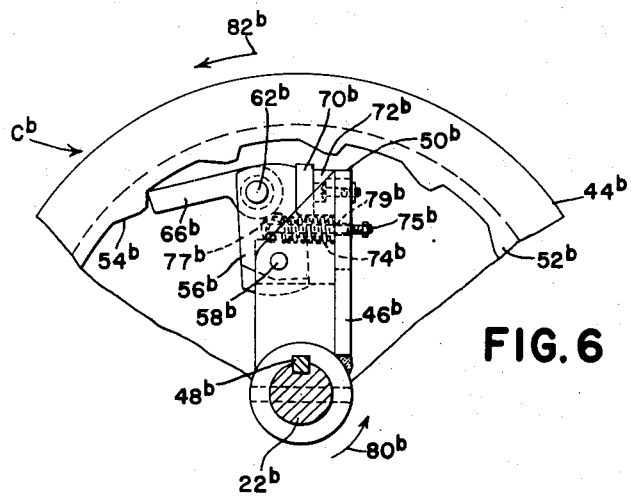
Fig. 6 is a view like Figs. 2 and 4 but showing a third form of clutch.

In the schematic illustration in Fig. 1, the tractor is designated generally by the letter T and the baler is denoted by the letter B. The tractor, as is conventional, is powered by an internal combustion engine (not shown) which in addition to driving traction wheels 10 furnishes power to a power take-off shaft 12. The power take-off shaft projects at the rear of the tractor just above a drawbar 14 and is connected by a universal joint 16 to the front end of a propeller shaft 18 which has its rear end connected by a universal joint 20 to a driven shaft or driven member 22. The drawbar 14 affords a draft connection for the forward end of a draft tongue 24, which is here shown as being of the hollow type for enclosing the propeller shaft 18. These details are not unconventional and need not be elaborated.

The baler B comprises a transverse bale case 26, carried on a pair of transversely spaced wheels 28 and including a forwardly extending pickup 30 which operates as usual to pick up crops from the ground and to move them rearwardly into the bale case 26 and into the path of a reciprocating plunger 32. The plunger is reciprocated by a crankshaft 34 which is connected by gearing 36 to a shaft 38 on which is mounted a sheave 40 and a flywheel 42.

The rear end of the driven shaft 22 has a clutch, designated generally by the letter C, for transmitting power to the flywheel shaft 38, the drive being accomplished by a drive belt 43 trained about the sheave 40 and about a sheave 44 which constitutes the driven member of the clutch C.

The ensuing description will pertain primarily to Figs. 2 and 3, wherein it is shown that the driving shaft or member 22 has keyed thereto for rotation therewith a first arm means 46. The driving connection between the shaft 22 and arm 46 is effected by a key 48; although, any other form of connection could be used. The arm means 46 extends radially outwardly from the shaft 22 and has an outer end portion 50 in proximity to an annular drive element 52 formed on the sheave or driven member 44 about the axis of rotation of the members 22 and 44. The annular drive element preferably comprises a series of angularly spaced apart lugs 54 arranged on a circle concentric about the axis of rotation. The driving member 22 carries a second arm means, designated generally by the numeral 56. The mounting of the second arm means 56 on the driving member 22 is, in the form of the invention shown in Figs. 2 and 3, effected by means of mounting the first or inner end of the arm means 56 on the arm means 46 via a pivot pin 58, with the outer or second end of the arm means 56 projecting into proximity to the drive lug circle or annular element 52.

As shown in Fig. 3, the arm means 56 comprises a pair of transversely spaced apart arms 60, cross-connected at their first ends by the pivot pin 58, which is parallel to the axis of the shaft 22, and cross-connected at their outer or second ends by a transverse pivot pin 62, which pin is parallel to the pin 58. The pin 62 is fixed at opposite ends to the arms 60 by means of retaining pins 64, the retaining pins thus serving to hold the pin 62 against rotation. A pawl 66 is mounted on the pin 62 between the arms 60 by means of a cushion 68 of elastomer material such as rubber. The cushion 68 is torsionally preloaded to bias the pawl 66 radially outwardly and into engagement with the drive element 52 on the driven member or sheave 44. The cushion is preferably bonded to both the pin 62 and to the interior of the pawl 66, a process that is itself not novel. The outer end portion 50 of the first arm means 46 serves as a first stop element which is co-operative with a second stop element 70 afforded by the rear or trailing part of the pawl 66. The stop element 50 carries shock-absorbing means in the form of a block 72 of elastomer material such as rubber; although, the block could as well be carried by the stop element 70.

Because of the pivotal mounting of the arm means 56 at 58 on the first arm means 46, the two arms may have relative angular movement back and forth respectively in the direction of rotation and in the direction counter to the direction of rotation of the members 22 and 44. The cushioned stop means 70—72 achieves a limit on relative movement of the arm 56 in the counter-rotative direction. Biasing means in the form of a torsion spring 74 operates between the arm means 46 and 56 to bias the arm means 56 in the direction of rotation. The torsion spring is preferably wound or coiled around the pin 58 and has first and second legs 76 and 78 respectively connected to and acting on the arm means 46 and 56.

In operation, the power take-off shaft 12 drives the driving shaft or member 22 in the direction of the arrow 80 and the drive is transmitted through the arm means 46 and 56 to the pawl 66 which in turn engages one of the lugs 54 on the driven member 44 to rotate the driven member in the direction of the arrow 82, which is the same as the direction of the driving member 22. Because of the inclusion in the power train of universal joints at 16 and 20, there will occur fluctuations in the angular velocity of the driving shaft 22. Because of the kinetic energy of the flywheel 42 and plunger 32, the angular velocity of the sheave 44 will tend to remain constant. Consequently, when the speed of the shaft 22 falls off slightly, there will occur an angular gain of the sheave 44 over the driving shaft 22. This angular gain will ordinarily be reflected in separation of the lug 54 from the pawl 66. But such separation cannot occur in the present case, when the angular differences in velocity are minor, because the biasing means or spring 74 urges the pawl 66 in the direction of rotation, thereby tending to cause the pawl 66 to follow and remain in engagement with its initially engaged lug 54. This means, of course, that the stop elements 70 and 72 will separate and then re-engage, but the noise problem at this point is eliminated because of the cushioning block 72. Moreover, the cushion at 68 serves not only to bias the pawl into engagement with the lug circle or element 52 but itself will absorb a considerable portion of the shock that will occur when the angular velocity of the shaft 22 again picks up. Of course, in instances in which the angular gain of the driven member 44 over the driving member 22 is of major proportions, as when the power take-off shaft 12 is shut down, the driving member will be overrun by the driven member. In these cases the pawl 66 will yield radially inwardly as is usual so that successive lugs 54 can pass thereover.

The ensuing description will pertain to that form of the invention shown in Figs. 4 and 5, wherein the clutch in its entirety is designated by the letters $C^a$; although it is in many respects similar to the clutch C. For that reason, similar reference characters, bearing the suffix "a," will be used. Thus, the clutch $C^a$ comprises a driven member or sheave $44^a$ connected to a driving member or shaft $22^a$ by means of arm means $46^a$ connected to the shaft $22^a$ by a key $48^a$. The arm $46^a$ has an outer end $50^a$ proximate to an annular drive element $52^a$ equipped with angularly spaced lugs $54^a$.

A second arm $56^a$ is carried by the driving member $22^a$ by means of a pivot pin $58^a$ that connects the arms $56^a$ and $46^a$. The arm means $56^a$ includes spaced apart arms $60^a$ that are cross-connected by the pin $58^a$ at their inner ends and that are cross-connected at their outer ends by a transverse pin $62^a$ on which is mounted a driving pawl $66^a$, this pawl normally cooperating with the lugs $54^a$ in the same manner that the previously described pawl 66 cooperates with the lugs 54 in the clutch C of Figs. 2 and 3.

The pawl $66^a$ is mounted on the pin $62^a$ by a simple bearing and does not include a cushion such as the cushion 68 of Figs. 2 and 3. However, in this form of the invention, the pawl $66^a$ is in the form of a bell crank having first and second arms $65^a$ and $67^a$. The arm $67^a$ is a lug-engaging arm and the arm $65^a$ is a control arm, being acted on by biasing means in the form of a torsion spring $74^a$ that is wound or coiled around the pin $58^a$ and that has first and second legs $76^a$ and $78^a$. The leg $76^a$ is connected to and acts against the arm means $46^a$, while the other leg $78^a$ of the spring is connected to and acts against the control arm $65^a$ of the pawl $66^a$. Thus, the spring $74^a$ serves not only the function of the spring 74 of the clutch C but also serves to bias the pawl $68^a$ outwardly and into engagement with the driving lug circle or element $52^a$, at the same time affording means whereby the pawl $66^a$ may yield when overrunning of the driving member $22^a$ by the driven member $44^a$ occurs. The outer end $50^a$ of the arm means $46^a$ carries a stop element in the form of a block of elastomer material, as at $72^a$, and the rear end $70^a$ of the pawl $66^a$ constitutes a cooperating stop element.

The operation of the clutch $C^a$ is not materially different from that of the clutch C.

In the interests of brevity, reference numerals corresponding to those used in the description of the clutches C and $C^a$, are applied to the clutch $C^b$ of Fig. 6 without specific description, utilizing the suffix "b." However, there are a few differences that will require specific description.

As will be seen, the arm $56^b$ is mounted on the arm $46^b$ by means of the pivot $58^b$ and that cooperative stops $70^b$ and $72^b$ limit counter-rotative angular movement of the arm $56^b$. No special means for biasing the pawl $66^b$ into engagement with the driving lug circle or element $52^b$ is shown, because in a clutch of this nature in which the pawl operates radially outwardly, centrifugal force will serve as the biasing means. However, a biasing means could be used such as those illustrated in connection with the clutches C and $C^a$, as well as that to be described in connection with the clutch $C^c$. The arm $56^b$ is biased in the direction of rotation by biasing means comprising a compression spring $74^b$ carried on a bolt $75^b$ that passes through a lug $77^b$ on the arm means $56^b$ and through an apertured rear wall portion $79^b$ of the arm $46^b$. The spring $74^b$ thus acts between the two arms $46^b$ and $56^b$ to accomplish the purpose of the torsion springs 74 and $74^a$ in the clutches C and $C^a$. Otherwise, the fundamentals of structure and operation are the same.

Figure 7:
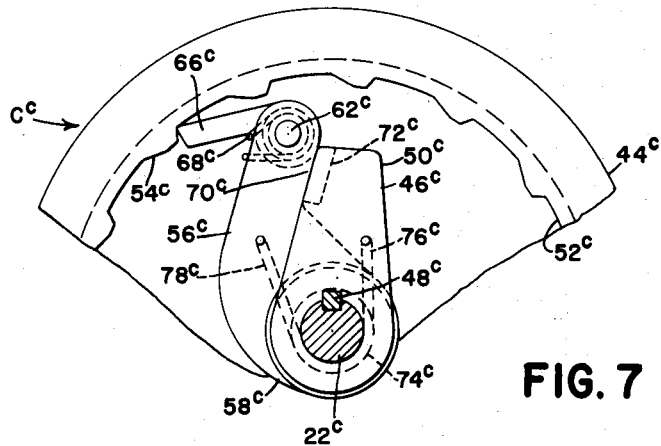
Fig. 7 is a view similar to Figs. 2, 4 and 6 but showing a fourth form of clutch.

In the description of the form of clutch $C^c$ (Fig. 7), the general pattern of reference characters is followed, using the suffix "c" on reference numerals already used to describe the basic parts common to all clutches. Hence, no specific description need be resorted to, with the exception that in clutch $C^c$ the arm $56^c$ is mounted directly on the driving shaft $22^c$ by a coaxial mounting as at $58^c$.

This means that the torsion spring 74c will be wound around the shaft 22c rather than around the pivot pin 58 or 58a as in the cases of clutches C and Ca.

Another distinction is that the pawl 66c is biased into engagement with the lugs 54c by a small torsion spring 68c, which spring has part of the function of the cushion 68 of the clutch C. Otherwise, the structure and fundamentals of the clutch Cc are the same as those of the clutches previously described.

Various features and advantages of the invention, not specifically enumerated herein, will undoubtedly occur to those versed in the art, as will many modifications and alterations in the preferred forms of the invention illustrated, all of which may be achieved without departing from the spirit and scope of the invention.

What is claimed is:

1. Driving mechanism of the character described, comprising: a uni-directionally rotatable driving member subject to fluctuations in angular velocity; a driven member coaxial with and adapted to rotate in the same direction as the driving member, said driven member having thereon a plurality of drive lugs spaced apart angularly about a circle concentric with the axis of the members; a drive arm having first and second ends respectively proximate to the driving member and the drive lug circle; means connecting the first end of the arm to the driving member for back and forth angular movement of the arm relative to the driving member in the direction of rotation and in a direction counter to the direction of rotation of the members; a stop fixed to the driving member and engageable with the arm to limit counter-rotative angular movement of the arm; a pawl carried by the second end of the arm and one-way engageable with one of the drive lugs for effecting driving of the driven member by the driving member, said pawl being yieldable away from said lug to enable successive lugs to pass the pawl when the angular gain in velocity of the driven member over the driving member is of such major magnitude as to incur overrunning of the driving member by the driven member; and biasing means between the arm and the driving member and acting to urge the arm, together with the pawl, away from the stop and in the aforesaid direction of rotation of the members so that during minor angular gains of the driven member over the driving member the pawl tends to follow and remain in engagement with the lug initially engaged thereby.

2. Driving mechanism of the character described, comprising: a uni-directionally rotatable driving member subject to fluctuations in angular velocity; a driven member coaxial with and adapted to rotate in the same direction as the driving member, said driven member having thereon an annular-drive element concentric with the axis of the members; a drive arm having first and second ends respectively proximate to the driving member and the annular-drive element; means connecting the first end of the arm to the driving member for back and forth angular movement of the arm relative to the driving member in the direction of rotation and in a direction counter to the direction of rotation of the members; a stop fixed to the driving member and engageable with the arm to limit counter-rotative angular movement of the arm; pawl means carried by the second end of the arm and one-way engageable with a portion of the drive element for effecting driving of the driven member by the driving member, said pawl means being yieldable away from said element to enable successive portions of the element to pass the pawl when the angular gain in volocity of the driven member over the driving member is of such major magnitude as to incur overrunning of the driving member by the driven member; and biasing means between the arm and the driving member and acting to urge the arm, together with the pawl means, away from the stop and in the aforesaid direction of rotation of the members so that during minor angular gains of the driven member over the driving member the pawl tends to follow and remain in engagement with the element portion initially engaged thereby.

3. The invention defined in claim 2, including: shock-absorbing means interposed between the stop and the drive arm to cushion engagement of said arm.

4. Driving mechanism of the character described, comprising: a uni-directionally rotatable driving member subject to fluctuations in angular velocity; a driven member coaxial with and adapted to rotate in the same direction as the driving member, said driven member having thereon a plurality of drive lugs spaced apart angularly about a circle concentric with the axis of the members; first arm means fixed to the driving member and extending radially therefrom toward the drive lug circle; second arm means having a first end pivoted to the first arm means on an axis parallel to the axis of rotation and a second end proximate to the drive lug circle; stop elements respectively on the first and second arm means and engageable to limit pivoting of the second arm means relative to the first arm means in a direction counter to the direction of rotation of the members; pawl means pivoted to the second end of the second arm means on an axis parallel to the aforesaid axes and biased into engagement with one of the drive lugs to afford a one-way drive connection between the members, said pawl means being yieldable against its bias to enable successive lugs to pass thereover when the angular gain in velocity of the driven member over the driving member is of such major magnitude as to incur overrunning of the driving member by the driven member; and biasing means between the two arm means and acting to separate the arm means and the stop elements in the direction of rotation of the members so that during minor angular gains of the driven member over the driving member the pawl means tends to follow and remain engaged with the drive lug initially engaged thereby.

5. The invention defined in claim 4, in which: the biasing means between the two arm means comprises a compression spring having opposite ends seated respectively on the arm means.

6. The invention defined in claim 4, in which: the biasing means between the two arm means comprises a torsion spring wound on the pivot of the arm means and having first and second legs acting respectively on the first and second arm means.

7. The invention defined in claim 4, in which: the pawl means is in the form of a bell crank having a lug-engaging arm and a control arm, said control arm extending proximate to the first arm means; and the biasing means between the two arms acts against the control arm and reacts against the first arm means to bias the first and second arm means apart as aforesaid and simultaneously to bias the pawl means about its pivot for lug-engagement of its lug-engaging arm.

8. The invention defined in claim 4, in which: the pivot of the pawl means to the second arm includes a cushion of elastomer material.

9. The invention defined in claim 8, in which: the cushion is torsionally pre-loaded to urge the pawl means radially into engagement with a lug and to permit yielding of the pawl means to accommodate overrunning of the pawl means by successive lugs as aforesaid.

10. Driving mechanism of the character described, comprising: a uni-directionally rotatable driving member subject to fluctuations in angular velocity; a driven member coaxial with and adapted to rotate in the same direction as the driving member, said driven member having thereon an annular-drive element concentric with the axis of the members; first arm means fixed to the driving member and extending radially therefrom toward the annular-drive element; second arm means having a first end pivoted to the driving member for back and forth angular movement relative to the driving members in the direction of rotation and in a direction counter to the direction of rotation of the members, said second arm means having a second end proximate to the annular-drive element; stop elements respectively on the first and second arm means and engageable to limit counter-rotative movement of the second arm means relative to the first arm means; pawl means pivoted to the second end of the second arm means on an axis parallel to the aforesaid axes and biased into engagement with a portion of the drive element to afford a one-way drive connection between the members, said pawl means being yieldable against its bias to enable successive portions of the drive element to pass thereover when the angular gain in velocity of the driven member over the driving member is of such major magnitude as to incur overrunning of the driving member by the driven member; and biasing means between the two arm means and acting to separate the arm means and the stop elements in the direction of rotation of the members so that during minor angular gains of the driven member over the driving member the pawl means tends to follow and remain engaged with the drive element portion initially engaged thereby.

11. The invention defined in claim 10, in which: the pivot of the second arm means to the driving member is coincident with the axis of rotation of the members.

12. The invention defined in claim 11, in which: the biasing means between the two arm means comprises a torsion spring coiled about the axis of rotation and having first and second legs acting respectively on the first and second arm means.

References Cited in the file of this patent

UNITED STATES PATENTS 1,844,272   Clark _____ Feb. 9, 1932

FOREIGN PATENTS 991,405   France _____ Oct. 5, 1951